US008826293B2

(12) United States Patent
Jaquet et al.

(10) Patent No.: US 8,826,293 B2
(45) Date of Patent: *Sep. 2, 2014

(54) VISUALIZATION-CENTRIC PERFORMANCE-BASED VOLUME ALLOCATION IN A DATA STORAGE SYSTEM

(75) Inventors: Stefan Jaquet, Morgan Hill, CA (US); Madhukar R. Korupolu, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 13/458,633

(22) Filed: Apr. 27, 2012

(65) Prior Publication Data

US 2012/0216209 A1 Aug. 23, 2012

Related U.S. Application Data

(63) Continuation of application No. 12/394,393, filed on Feb. 27, 2009, now Pat. No. 8,214,842.

(51) Int. Cl.
*G06F 9/46* (2006.01)
*G06F 3/00* (2006.01)
*G06F 3/048* (2013.01)

(52) U.S. Cl.
USPC ............ 718/105; 718/104; 715/739; 715/788

(58) Field of Classification Search
CPC .................................................. G06F 3/0605
See application file for complete search history.

(56) References Cited

U.S. PATENT DOCUMENTS

| 5,973,690 | A | 10/1999 | Ofer et al. | |
| 6,404,444 | B1 * | 6/2002 | Johnston et al. | 715/839 |
| 6,933,943 | B2 | 8/2005 | Alcorn | |
| 7,290,048 | B1 | 10/2007 | Barnett et al. | |
| 7,639,254 | B2 * | 12/2009 | Takiguchi et al. | 345/428 |
| 2007/0174569 | A1 | 7/2007 | Schnapp et al. | |
| 2008/0192653 | A1 * | 8/2008 | Onodera | 370/256 |
| 2008/0288739 | A1 * | 11/2008 | Bamba et al. | 711/172 |

OTHER PUBLICATIONS

Cornelius Toole, Jr. et al., "Network Flow Based Resource Brokering and Optimization Techniques for Distributed Data Streaming Over Optical Networks," MG '08, Jan. 29-Feb. 3, 2008, Baton Rouge, LA, USA Copyright (c) 2008 ACM 978-1-59593-835-0/08/02, 8 pages.

* cited by examiner

*Primary Examiner* — Abdullah Al Kawsar
*Assistant Examiner* — James J Lee
(74) *Attorney, Agent, or Firm* — Griffiths & Seaton PLLC

(57) ABSTRACT

A method, system, and computer program product for visualization-centric performance-based volume allocation in a data storage system using a processor in communication with a memory device is provided. A unified resource graph representative of a global hierarchy of storage components in the data storage system, including each of a plurality of storage controllers, is generated. The unified resource graph includes a common root node and a plurality of subtree nodes corresponding to each of a plurality of nodes internal to the plurality of storage controllers. The common root node and the plurality of subtree nodes are ordered in a top-down orientation. Scalable volume provisioning of an existing or new workload amount by graphical manipulation of at least one of the storage components represented by the unified resource graph is performed based on an input.

20 Claims, 10 Drawing Sheets

VISUALIZATION-CENTRIC PERFORMANCE-BASED VOLUME ALLOCATION IN A DATA STORAGE SYSTEM

REFERENCE TO RELATED APPLICATION

The present invention is a continuation of U.S. patent application Ser. No. 12/394,393, filed on Feb. 27, 2009, now U.S. Pat. No. 8,214,842, issued on Jul. 3, 2010.

BACKGROUND OF THE INVENTION

1. Field of the Invention

The present invention relates in general to computers, and more particularly to apparatus, method and computer program product embodiments for visualization-centric performance-based volume allocation in a data storage system.

2. Description of the Related Art

Computers and computer systems are found in a variety of settings in today's society. Computing environments and networks may be found at home, at work, at school, in government, and in other settings. Computing environments increasingly store data in one or more storage environments apart from the interface that computer users typically associate. In many cases, the storage environments are located across wide area networks (WANs), in which data is sent to/received from a storage system located remotely from the host. These storage environments generally include one or more data storage systems and related storage components. Typically, the data storage systems and storage components include multitudes of storage volumes over which a storage controller or storage controllers are responsible.

Performance-based volume allocation is the task of determining where to allocate volumes for a workload based on the workload profile in terms of space and performance requirements and the current performance numbers at the various components of the storage controllers. This task becomes more challenging as the storage sizes keep increasing with an increasing number of disks per controller and an increasing number of controllers. Current single controller algorithms do not scale well with the increasing sizes and hence are not suitable for large dynamic storage control scenarios. Furthermore, conventional controller algorithms introduce large variances among system components.

Current storage controllers are sophisticated devices that can be modeled as a hierarchy of components where each component has its performance constraints. By modeling the storage controller as a hierarchy of components, dependencies between the hardware components in a storage controller may be captured. The current space and performance numbers for each component are obtained to ensure that no component in the hierarchy is overloaded; overloading of a single component in the hierarchy can disrupt workloads assigned to the storage pools associated with the component. Workload profiles for new workloads may be used to predict the space and performance requirements for new workloads. Other factors such as minimum and maximum permissible or required logical volume sizes can also impact the workload assignment decision-making process. The existing performance numbers along with the workload profiles and other factors mentioned above may be taken into account to determine suitable storage controller components for creating volumes for allocating the new workloads.

Conventional volume allocation in a data storage system having a hierarchy of storage components including the aforementioned storage controllers using the methodologies previously described has traditionally been that of the "black box" variety. In other words, given a set of inputs, a conventional algorithm for storage volume allocation is utilized to generate one or more outputs of where to allocate and how much. This black box functionality may cause a variety of questions to arise among users of the storage system, such information technology (IT) administrators. Some of these questions may relate to trusting the output provided, concerns as to whether better options are available, questions relating to the support behind the output decision, and the like.

SUMMARY OF THE INVENTION

In light of the foregoing, a need exists for an enhanced mechanism for volume allocation providing greater visibility to the user. In addition, such an enhanced mechanism should incorporate improved, performance-based algorithms for volume allocation, while flexibly providing greater user input and participation in the allocation process.

Accordingly, on one embodiment, by way of example only, a method for visualization-centric performance-based volume allocation in a data storage system using a processor in communication with a memory device is provided. A unified resource graph representative of a global hierarchy of storage components in the data storage system, including each of a plurality of storage controllers, is generated. The unified resource graph includes a common root node and a plurality of subtree nodes corresponding to each of a plurality of nodes internal to the plurality of storage controllers. The common root node and the plurality of subtree nodes are ordered in a top-down orientation. Scalable volume provisioning of an existing or new workload amount by graphical manipulation of at least one of the storage components represented by the unified resource graph is performed based on an input.

In an additional embodiment, again by way of example only, a system for visualization-centric performance-based volume allocation in a data storage system is provided. A graphical user interface (GUI) module is operational in the data storage system. The GUI module is adapted for generating a unified resource graph representative of a global hierarchy of storage components, including each of a plurality of storage controllers, in the data storage system. The unified resource graph includes a common root node and a plurality of subtree nodes corresponding to each of a plurality of nodes internal to the plurality of storage controllers. The common root node and the plurality of subtree nodes are ordered in a top-down orientation. The GUI module is further adapted for performing scalable volume provisioning of an existing or new workload amount by graphical manipulation of at least one of the storage components represented by the unified resource graph based on an input.

In still another embodiment, again by way of example only, a computer program product for visualization-centric performance-based volume allocation in a data storage system using a processor in communication with a memory device is provided. The computer program product comprises a computer-readable storage medium having computer-readable program code portions stored therein. The computer-readable program code portions include a first executable portion for generating a unified resource graph representative of a global hierarchy of storage components, including each of a plurality of storage controllers, in the data storage system. The unified resource graph includes a common root node and a plurality of subtree nodes corresponding to each of a plurality of nodes internal to the plurality of storage controllers. The common root node and the plurality of subtree nodes are ordered in a top-down orientation. The computer-readable program code portions include a second executable portion for performing scalable volume provisioning of an existing or new workload amount by graphical manipulation of at least one of the storage components represented by the unified resource graph based on an input.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
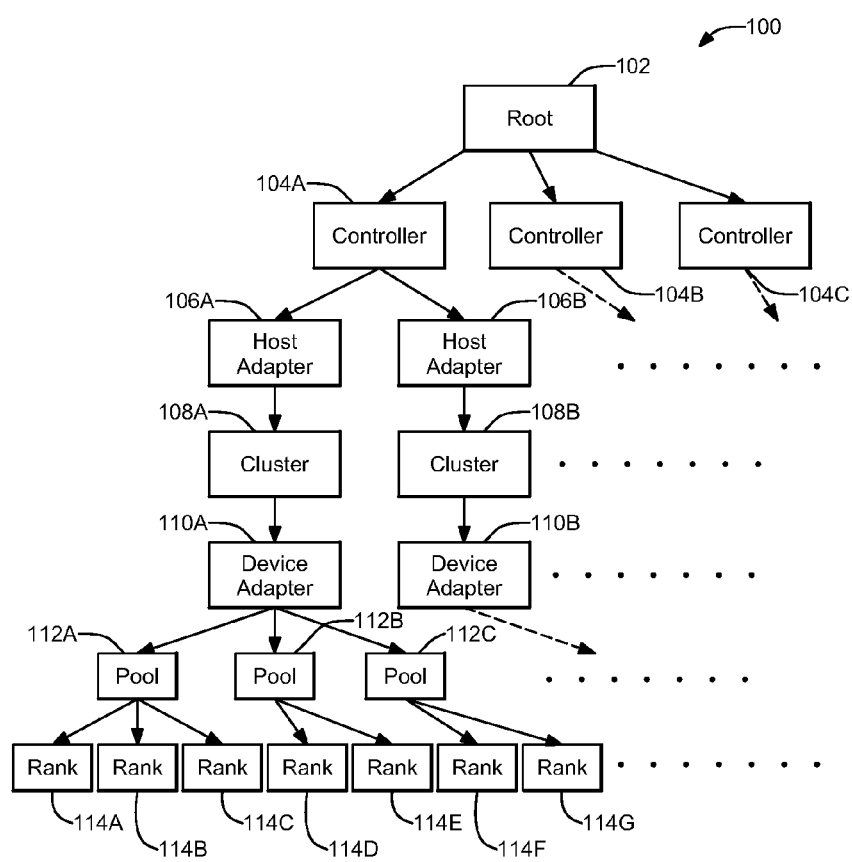
FIG. 1 illustrates an exemplary unified resource graph visually representing a tree style hierarchy of the dependencies between various interconnected hardware elements of a storage system.

Performance-based volume allocation represents an additional technological step forward for storage management and administration in modern data centers. Such volume allocation involves taking workload requirements in terms of space and performance profiles, current space and performance utilizations at various internal components of the controllers and determining where to allocate volumes for the new workload and how many.

Performance-based volume allocation is a challenging task traditionally done by vendor experts. These experts typically perform such allocation manually using rules of thumb, as controllers have complex internal structures such as pools, device adapters, host adapters, and the like, and bottlenecks could occur at any of these structures. Allocation at lower level leaf nodes needs to account for bottlenecks at higher up nodes. Furthermore, space-performance mismatches may occur at nodes in the sense that nodes with an abundance of available space may not always have enough of a remaining performance gap (for example, in terms of input-outputs/sec) as the workloads running on the nodes could be different. Allocation at one leaf node may influence allocations at other sibling leaf nodes due to dependent ancestor bottlenecks.

To address these issues, storage management vendors are beginning to include such functionality in administrative software tools, such as planning software. A remaining challenge in such tools, however, is that users do not have much visibility and insight into the inner workings of the tools themselves. For example, the user does not know why the tool is choosing the volume locations that are chosen. As described above, the user may question the volume allocations as a result.

Some conventional tools have a basic mechanism to write internal variables and states to log files. However, the prospect of scanning log files to understand the tool's choices is may be daunting, especially as the sizes of the data centers, including the number of controllers, number of disks, and additional storage components continue to rise. Currently, data storage environments having hundreds of storage controllers and hundreds, if not thousands of disks are not. Accordingly, asking administrators to read and understand log files may not be practical and well received.

To help alleviate this issue, the illustrated embodiments below provide mechanisms for facilitating visual-centric performance-based volume allocation in data storage systems. These embodiments provide visual cues accompanying the volume allocation process to a user, so as to facilitate greater involvement in the user in the allocation process. As a result, the user is made better aware of the data storage environment, potential constraints and bottlenecks, available and in-use resources, and the like without an accompanying requirement to view log files, for example.

The illustrated embodiments generate and/or display with the assistance of a graphical user interface (GUI) a unified resource graph merging all controllers with a common root node at the core, with internal nodes corresponding to internal nodes of the controller. A novel top-down method, tailored to visualization, is utilized to compute, update and display an aggregate summary measure for each subtree. This aggregate summary measure effectively captures the space-performance imbalances at each node in the subtree and also bottlenecks at internal nodes, accounting for the influence of allocation at one node on possible allocations at other nodes. Users can manually expand and compact nodes of interest, as well as zoom to specific subtrees.

The illustrated embodiments also provide for dynamic expansion and compression functionality of the resource graph based on various factors, such as a cursor position, or a size of the display screen, enabling scaling from small to large sizes and vice versa. The illustrated embodiments also support both interactive manual volume allocations by users/administrators using visualization and summary numbers calculated by an allocation algorithm as well as automatic selection by the algorithm. The interactivity and visual information increases visibility and ease of use.

FIG. 1 illustrates an exemplary unified resource graph 100 that visually represents a tree style hierarchy of the dependencies between the various interconnected hardware elements of a storage system. The node at the top of the unified resource graph tree structure is the root node 102, which has all of the controllers for the various storage components 104A, 104B and 104C, connected to it. The root node 102 is the central access point for all data into and out of the storage system represented by the unified resource graph 100. The storage controllers 104A, 104B and 104C and the subtrees beneath each of them may be referred to as the controller resource graphs. Note that in the example only one complete branch of the unified resource graph 100 is shown to the leaf nodes (ranks) at the bottom. It should also be noted that a leaf node (rank) may comprise one or more of the volumes to be allocated by the allocation algorithm. The combination of the of the controller resource graphs under the common root node 102 form the unified resource graph 100. In the example, the storage controller 104A is communicatively coupled to host adapters 106A and 106B, which connect the host system to the storage devices. The host adapter 106A is connected to the cluster 108A, which provides the management for the storage system. The cluster 108A is connected with the device adapter 110A, which provides communication between the cluster 108A and the storage devices grouped into ranks 114A-114G. The storage pools 112A, 112B and 112C, identify which of the volumes, or storage devices, that should be managed by the controllers.

It should be noted that the unified resource graph 100 depicted is only an example; different storage systems will be represented by different graphs as will be understood by those skilled in the art. For example, other systems may couple controllers to different numbers of host adapters and/or device adapters may oversee different numbers of pools and rank below them, depending upon the particular storage system architecture. Completely different architectures having different component layers may also be implemented with embodiments of the invention; the unified resource graph 100 is used to capture generic performance characteristics of an interconnected arrangement of nodes without regard to the specific hardware or architecture as will be understood by those skilled in the art.

Embodiments of the invention may operate using a top-down estimation and selection process. The top-down estimation process is driven by the compilation of a unified resource graph from the controller resource graphs used with the performance numbers from storage components. This process is used to determine if all the children nodes can support as much load as the parent node. If the sum of the loads that all the child nodes can support is less than that which the parent node can support, the estimate for the parent node is reduced to the estimate of the sum of the loads that its child nodes can support. The top-down selection process is based on the analysis of the top-down estimation. It is referred to as "top-down" because the algorithm traverses each level of the unified resource graph and volumes are allocated in the last, most specific node of the graph.

Figure 2A:
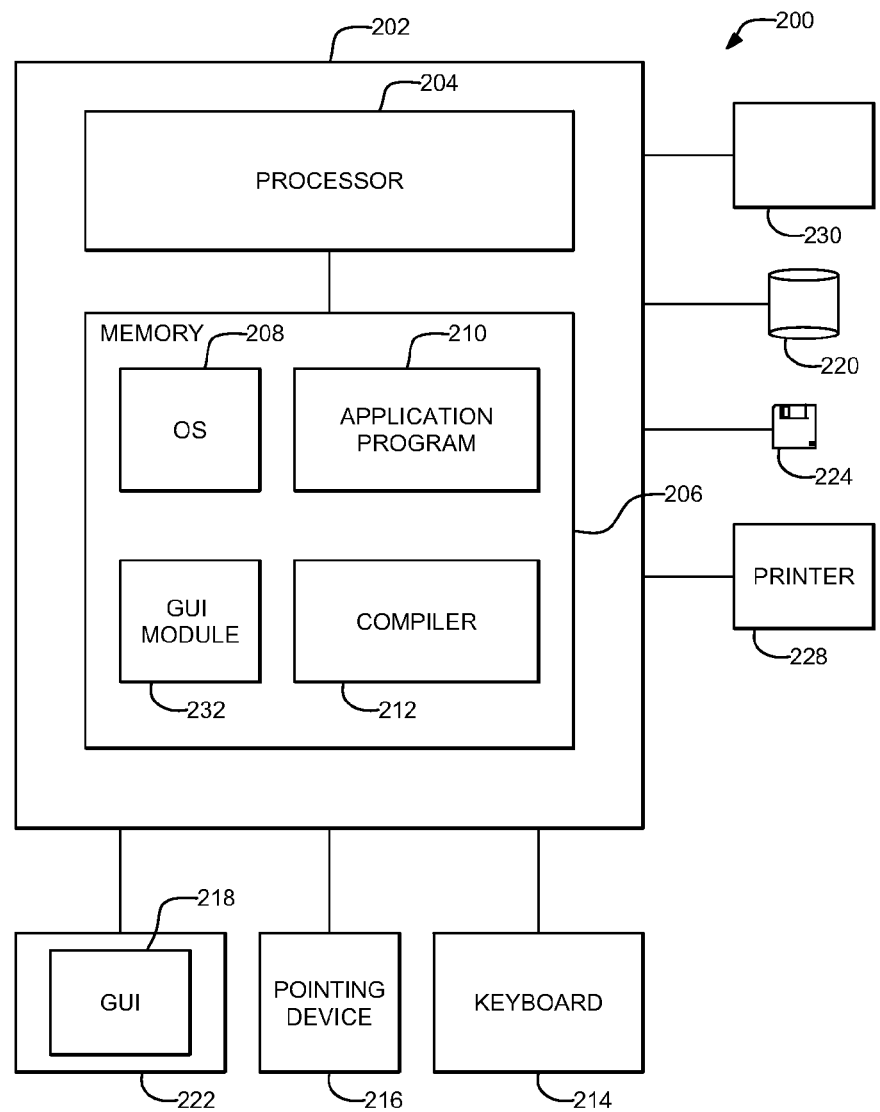
FIG. 2A illustrates an exemplary computer system that can be used to implement embodiments of the present invention.

FIG. 2A illustrates an exemplary computer system 200 that can be used to implement embodiments of the present invention. The computer 202 comprises a processor 204 and a memory 206, such as random access memory (RAM). The computer 202 is operatively coupled to a display 222, which presents images such as windows to the user on a graphical user interface (GUI) 218. The computer 202 may be coupled to other devices, such as a keyboard 214, a mouse device 216, a printer 228, etc. Of course, those skilled in the art will recognize that any combination of the above components, or any number of different components, peripherals, and other devices, may be used with the computer 202.

Generally, the computer 202 operates under control of an operating system 208 (e.g. z/OS, OS/2, LINUX, UNIX, WINDOWS, MAC OS) stored in the memory 206, and interfaces with the user to accept inputs and commands and to present results, for example through a GUI module 232. Although the GUI module 232 is depicted as a separate module, the instructions performing the GUI functions can be resident or distributed in the operating system 208, a computer program 210, or implemented with special purpose memory and processors.

The illustrated embodiments of the present invention may utilize the GUI module 232 to generate visual representations of the unified resource graph and the aggregate summary measures previously described for each subtree of the graph for display on GUI 218. Further, the GUI module 232 may be adapted for, along with other subcomponents of the computer 202 such as the processor 204 as the skilled artisan will anticipate, generating visual representations of automated and/or manual allocation functionality, dynamic and/or manual expansion and reduction functionality, generating visual flags to indicate bottlenecks, and generating bars and measures to assist users in performing allocation functions. The functionality as performed by the GUI module 232 will be further described in detail, following.

The computer 202 also implements a compiler 212 that allows one or more application programs 210 written in a programming language such as COBOL, PL/1, C, C++, JAVA, ADA, BASIC, VISUAL BASIC or any other programming language to be translated into code that is readable by the processor 204. After completion, the computer program 210 accesses and manipulates data stored in the memory 206 of the computer 202 using the relationships and logic generated using the compiler 212. The computer 202 also optionally comprises an external data communication device 230 such as a modem, satellite link, Ethernet card, wireless link or other device for communicating with other computers, e.g. via the Internet or other network.

Instructions implementing the operating system 208, the computer program 210, and the compiler 212 may be tangibly embodied in a computer-readable medium, e.g., data storage device 220, which may include one or more fixed or removable data storage devices, such as a zip drive, floppy disc 224, hard drive, DVD/CD-ROM, digital tape, etc., which are generically represented as the floppy disc 224. Further, the operating system 208 and the computer program 210 comprise instructions which, when read and executed by the computer 202, cause the computer 202 to perform the steps necessary to implement and/or use the present invention. Computer program 210 and/or operating system 208 instructions may also be tangibly embodied in the memory 206 and/or transmitted through or accessed by the data communication device 230. As such, the terms "article of manufacture," "program storage device" and "computer program product" as may be used herein are intended to encompass a computer program accessible and/or operable from any computer readable device or media.

Some embodiments of the present invention may be directed to a software application program 210 that manages data objects (i.e., files) access to a storage system comprised of multiple separate storage devices. The program 210 may operate within a single computer 202 or as part of a distributed computer system comprising a network of computing and storage devices. The network may encompass one or more computer/storage devices connected via a local area network and/or Internet connection (which may be public or secure, e.g. through a VPN connection).

Figure 2B:
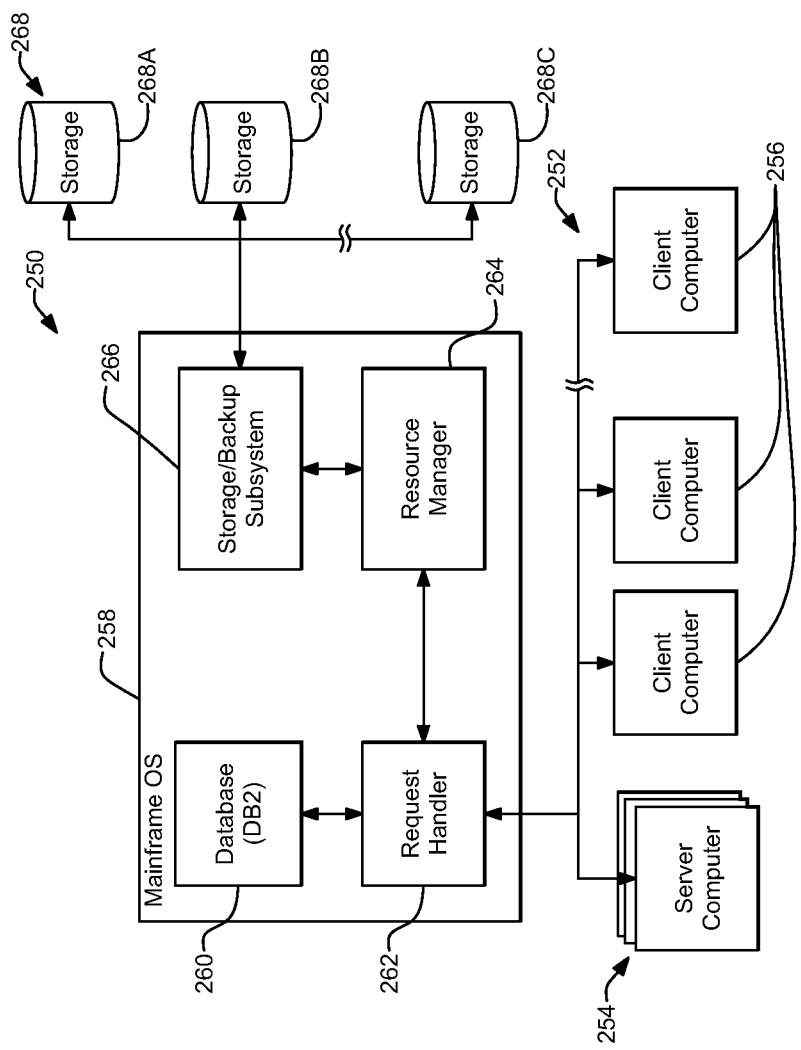
FIG. 2B illustrates a typical distributed computer system which may be employed in an typical embodiment of the invention.

FIG. 2B illustrates a typical distributed computer system 250 which may be employed with a typical embodiment of the invention. Such a system 250 comprises a plurality of computers 202 which are interconnected through respective communication devices 230 in a network 252. The network 252 may be entirely private (such as a local area network within a business facility) or part or all of the network 252 may exist publicly (such as through a virtual private network (VPN) operating on the Internet). Further, one or more of the computers 202 may be specially designed to function as a server or host 254 facilitating a variety of services provided to the remaining client computers 256. In one example, one or more hosts may be a mainframe computer 258 where significant processing for the client computers 256 may be performed. The mainframe computer 258 may comprise a database 260 which is coupled to a request handler 262 which implements a number of database procedures for other networked computers 202 (servers 254 and/or clients 256). The request handler 262 is also coupled to a resource manager 264 that directs data accesses through storage/backup subsystem 266 that facilitates accesses to networked storage devices 268 comprising a SAN. Thus, the storage/backup subsystem 266 on the computer 258 comprises the backup server that manages backup data objects from the client computers 256 stored on networked storage devices 268 in a distributed storage system. The SAN may include devices such as direct access storage devices (DASD) optical storage and/or tape storage indicated as distinct physical storage devices 268A-268C. Various known access methods (e.g. VSAM, BSAM, QSAM) may function as part of the storage/backup subsystem 266.

Figure 2C:
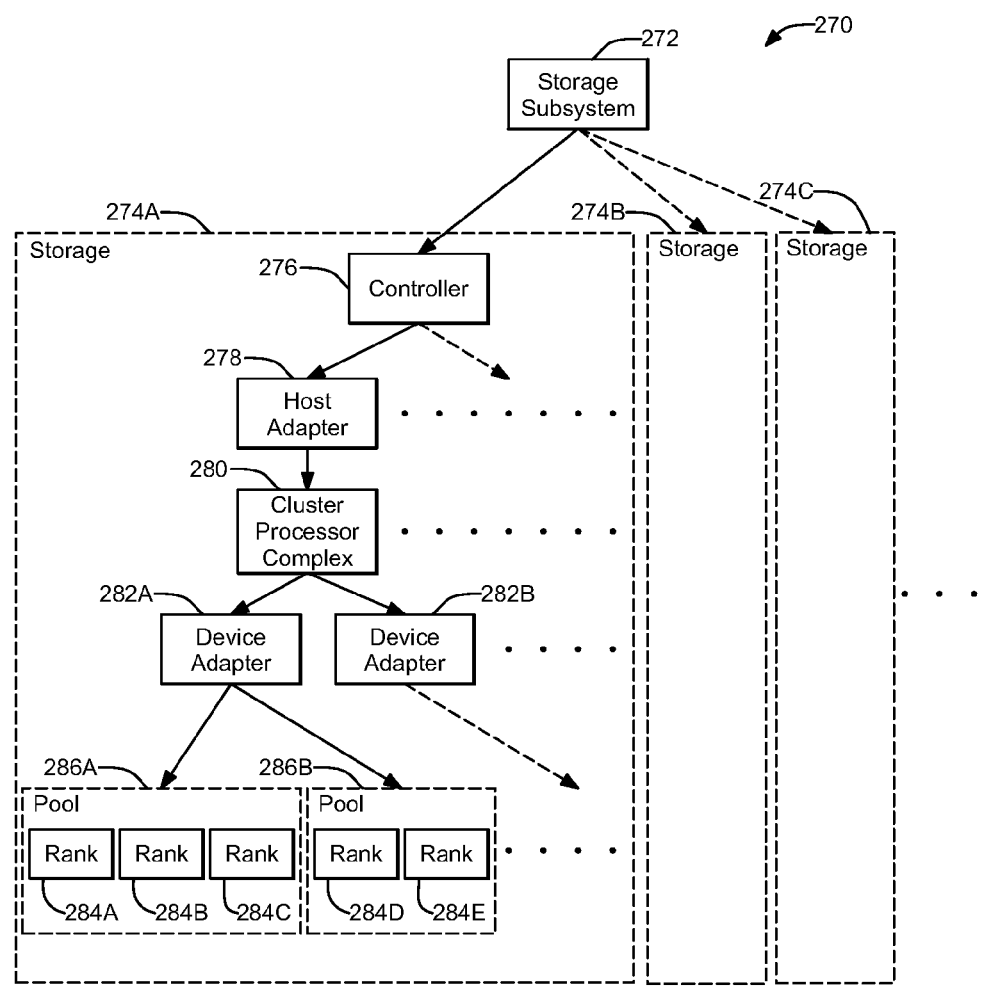
FIG. 2C illustrates a typical storage system implementing an embodiment of the invention.

FIG. 2C illustrates a typical storage system 270 implementing an embodiment of the invention. For example, the storage system 270 may operate as part of the storage/backup subsystem 266 and storage devices 268 in the distributed computer system 250 of FIG. 2B. A typical implementation of the invention comprises a program operating on the storage subsystem 272 (e.g., the storage/backup subsystem 266 of the computer 258 of FIG. 2B). The storage subsystem 272 is coupled to a plurality of storage devices 274A-274C. Although only one storage device 247A will be described in detail, it should be understood that other storage devices 274B, 274C may be similarly constituted. The controller 276 directs where data goes within the storage device 274A. The data is at least part of a storage workload coming through the storage subsystem 272. Typically, one or more host adapters 278 operate as the external interface to the system coupled to the cluster processor complex 280, which handles inputs and outputs coming from the one or more host adapters 278. The cluster processor complex 280 is connected to device adapters 282A and 282B, which connect the ranks 284A-E to the system that controls them. The ranks 284A-284E comprise the physical disks where the data is physically stored in the storage device 274A and which are accessed through one or more device adapters 282A, 282B coupled to the cluster processor complex 280. The ranks 284A-284E may be organized into one or more pools 286A, 286B under a given device adapter 282A. The described hardware architecture is only an example; those skilled in the art will understand that any number of different devices (e.g., controllers, host adapters, cluster processors, device adapters and physical disks comprising data volumes) may be coupled together in alternate architectures within the scope of the invention.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

As will be further described, one embodiment of the invention may incorporate one or more programmed algorithms that operate to direct the storage of a data workload into the various volumes of a storage system. The algorithm requires a workload profile and certain performance measurements of each node as input information and generates a list of the volumes ranking the order that they should be applied to the workload as output information. For example, the inputs to the algorithm may comprise a workload profile and controller resource graphs (showing performance measures, e.g. throughput rates, for each node of the controller).

The workload profile can include information such as the total workload size to be stored (e.g., in GB) and a nominal cost value at each node. The nominal cost value is a measure of the increase in performance utilization experienced at a node per GB of the workload on any pool associated with the particular node. Any node is associated with all its descendant pools in the resource graph hierarchy.

The controller resource graphs describe the structure of the different storage controllers in the storage system. This structure may vary for different controllers depending on the controller design; different controllers have different numbers of components in the described hierarchy (or any alternate hierarchy). The particular performance numbers (e.g., the 100% utilization throughput rates) for different components of the system are also provided as an input to the algorithm.

In addition, a maximum and minimum permissible logical volume size may be identified. The maximum and minimum volume size constraint maybe as determined by the system administrator or through some other constraints applied in the system. It is probably not feasible to employ very small or very large volume sizes; small volume sizes may lead to excessive fragmentation and large volume sizes may result in imbalance in the system.

An exemplary volume allocation algorithm as described above may proceed as follows. As will be further explained, the volume allocation algorithm may operate in conjunction with user interaction (a variety of user input, such as cursor movement or position) using GUI module 232 as presented on GUI 218 (FIG. 2A). The algorithm may be initiated in with an input of controller resource graphs (including performance values for each node of the resource graphs), a workload profile (including a total workload size to be stored and a nominal cost value at each node), and a minimum and a maximum volume size. As a next step, a gap value for each node of a global resource tree is determined for the storage system. The gap value for each node corresponds to an estimate of a new workload amount that can be allocated in one or more subtree nodes of the node without exceeding performance and space limits of any of the subtree nodes of the node. Next, an ordered allocation list of volumes on a plurality of leaf nodes of the global resource tree of the storage system is generated based on ordering the leaf nodes by the gap value for each of the leaf nodes. Finally, the ordered allocation list of volumes to be allocated may be output from the algorithm.

As described, embodiments of the invention can be implemented as an algorithm for scalable volume provisioning of new workloads on storage controller collections. The algorithms may be visually implemented by graphical manipulation by the user of the unified resource graph's illustrated components as presented to the user as will be further described. A better-balanced allocation can result without falling for the weaknesses associated with the other conventional storage allocation algorithms. One exemplary algorithm may utilize a post-order traversal method of the unified resource graph to determine a number of gap values (parents and children) corresponding to internal nodes of the graph. If the gap value of a particular node is less than a minimum gap size for a particular volume, then that gap value is set to zero. The algorithm then allocates volumes using assumptions for a minimum and a maximum size of allocable space needed in view of the gap values for each internal node.

In one embodiment, creation of the unified resource graph as previously described may proceed as follows. As a first step, each of the controller resource graphs, which are given as inputs, are combined under a single common root node. This construction of a unified resource graph permits a view of the entire storage system as a tree shaped structure with the resource graphs for different storage controllers as sub-trees. The algorithm described above operates on this unified resource graph. In a tree shaped structure for displaying a hierarchy, the top of the tree is referred to as the "root" node, nodes stemming from a single node are referred to as the "children" of the single "parent" node, and at the bottom of the tree, the last nodes that have no child nodes are referred to as "leaf" nodes.

After the unified resource graph is created, an estimate is created of the maximum permissible size of new workload based on the current performance utilization of the node and the nominal cost at that node, i.e. a node-specific performance limit estimate. The algorithm denotes these initial node-specific performance limit estimates of all of the nodes in the graph as the lgap(v), where v is the node being measured. In other words, the lgap is how many gigabytes of workload a certain node is capable of handling. Any suitable formula to determine the lgap may be used, such as the following exemplary formula:

$$lgap(v) = \min\{FreeSpace(v), (100 - perfUtil(v))/nominalCost(v)\}$$

$$if(lgap(v) < MinVSize) < lgap(v) = 0;$$

This formula factors in the performance utilization of the node and the nominal cost of the node and allows for correction of the lgap based on the minimum permissible volume size. If the calculated lgap is unable to handle even the lowest volume size, then the value is set to zero, as it is not possible to set a volume size smaller than the minimum. This formula factors in the performance utilization of the node and the nominal cost of the node, where nominal cost represents how much percentage performance utilization will be incurred on this node if a 1 GB unit of the new workload were allocated there. The nominal cost can differ for disk adapters, clusters, ranks etc., depending on the relative IO throughput and bandwidth transfer going through those nodes. If the calculated lgap is insufficient to handle even the lowest volume size, then the value is set to zero, as it is not possible to set a volume size smaller than the minimum.

Once the lgap values are determined, a smoothing or an averaging of the values can occur. The algorithm can perform a post-order traversal for each node, comparing the lgap value of each node with the sum of the lgap values of the child nodes. The smaller of the two values is chosen, and is now referred to as the gap value of the node. For each node v in the resource graph, gap(v) is the amount in GB of new workload that can be put in sub tree of v without exceeding performance or space bounds at any of the nodes in the subtree of v. By this logic, the gap value of the root node of the unified resource graph must be a good estimate of the total workload (in GB) that can be served in the system.

The post-order traversal comprises a systematic approach in which a tree structure can be processed, ensuring that all of the nodes are analyzed. The traversal starts at the root node of the tree and checks to see if the left node is a null value. If it is a null value, the right node is checked to see if it is a null value. If all children are null, the node is then visited. If the left child is not null, then post-order traversal is performed on the left node. Similarly, if the right node is not null, post-order traversal is performed on it as well. In all cases of post-order traversal, the left node is always checked first. In general, the sequence of operations in a post-order traversal is: left, right, visit—apply the traversal to the left node, apply traversal to the right node, and when those are completed, visit the current node. While the post-order traversal is presently described, other traversal methods may be implemented and are contemplated, as the skilled artisan will anticipate.

The gap value(s) as described above may be incorporated into an aggregate summary measure, reflecting the gap value(s), for one or more nodes in the unified resource graph. The aggregate summary measure combines space and performance constraints into a single value. As will be described further, these aggregate summary measure values may then be visually indicated to a user, for example, by display adjacent to the node that the measure is associated.

An exemplary top-down allocation process, in view of the gap value(s), may proceed as follows. Again, this allocation process may proceed automatically or with manual input from a user. Visual cues accompanying the allocation (such as display of the aggregate summary measure) are indicated to the user, and updated as necessary as will be described, following. As a first step, a selection of the first node from an ordered list of leaf nodes. This first node is the node with the highest gap value, able to handle the most workload. Once this node is selected, a determination is made as to how much of the volume can be allocated to the leaf node. The gap value must be greater than the minimum permissible volume size and smaller than the maximum permissible volume size. If this is the case, as much of the volume as possible is allocated to the selected node. The volume to be allocated is added to the ordered list, which becomes the output of the algorithm. The variable keeping track of how much has been allocated so far is updated and the gap values for all nodes are updated as well. During this updating of the gap values, the list that keeps the nodes in a sorted order is also updated to reflect the gap values after allocation. The overall algorithm performs this top-down allocation recursively until there is either no more workload to be allocated, or until there are no more places to allocate them to. As mentioned previously, at the end of the process, the output of the algorithm is a list of volumes to be allocated.

An exemplary embodiment of the invention implementing such an allocation process in view of the aggregate summary measure may be further described as follows. After making the initial calculations, the algorithm can begin with the allocation process and recursively attempt to find suitable volumes to be allocated. Starting at the root level of the resource graph, the algorithm can traverse down the graph in an attempt to find a suitable child of v recursively. It is required that the children of v are maintained in a sorted order, ordered by decreasing gap(v) values. The algorithm selects the child with the highest gap(v) value. It should be noted that other schemes which permit user-defined cost functions or policy mechanisms, (i.e., depending on raid levels, etc.) can also be used to determine which child node to select. This process is performed recursively until the algorithm encounters a node at the leaf level of the unified resource graph. In order to assign volumes at the leaf level, the algorithm determines a suitable volume size to be allocated at this leaf level. The volume size, as can be seen from the example algorithm, must be less than maximum permissible volume size and greater than minimum permissible volume size. The volume size must also be the minimum of the gap(v) value at the leaf node and the unallocated workload size (i.e., the Required Space less the Allocated Space).

Taking into consideration the foregoing constraints, the algorithm allocates a volume of size L' on this leaf node (i.e., at the pool level). The allocated volume is then added to the ordered allocation list and the total allocated space is incremented by the size of the allocated volume. Note that the feasibility of this allocation is guaranteed by the calculations involved. The next step involves updating of the gap(v) values. This may be accomplished using an function after each successful allocation to update the gap(v) values. The size of the allotted volume is used to recalculate the gap(v) values for each ancestor of the leaf node v selected.

For each ancestor u of leaf node v, the example algorithm decrements the lgap value by the size of allocated volume (L'). The childSum of u is also decremented by the same value and newval is calculated as the minimum of lgap(u) and childSum(u). The example algorithm ensures that newval is not less minimum volume size (else it is set to zero) and assigns the value of newval as the new gap(u) value. The value of decrement is revised as a decrement equal to the gap(u) less newval for calculations at the higher level. The process is iteratively repeated until the updating has been performed at the root level, and all gap values have been successfully updated.

Figure 3A:
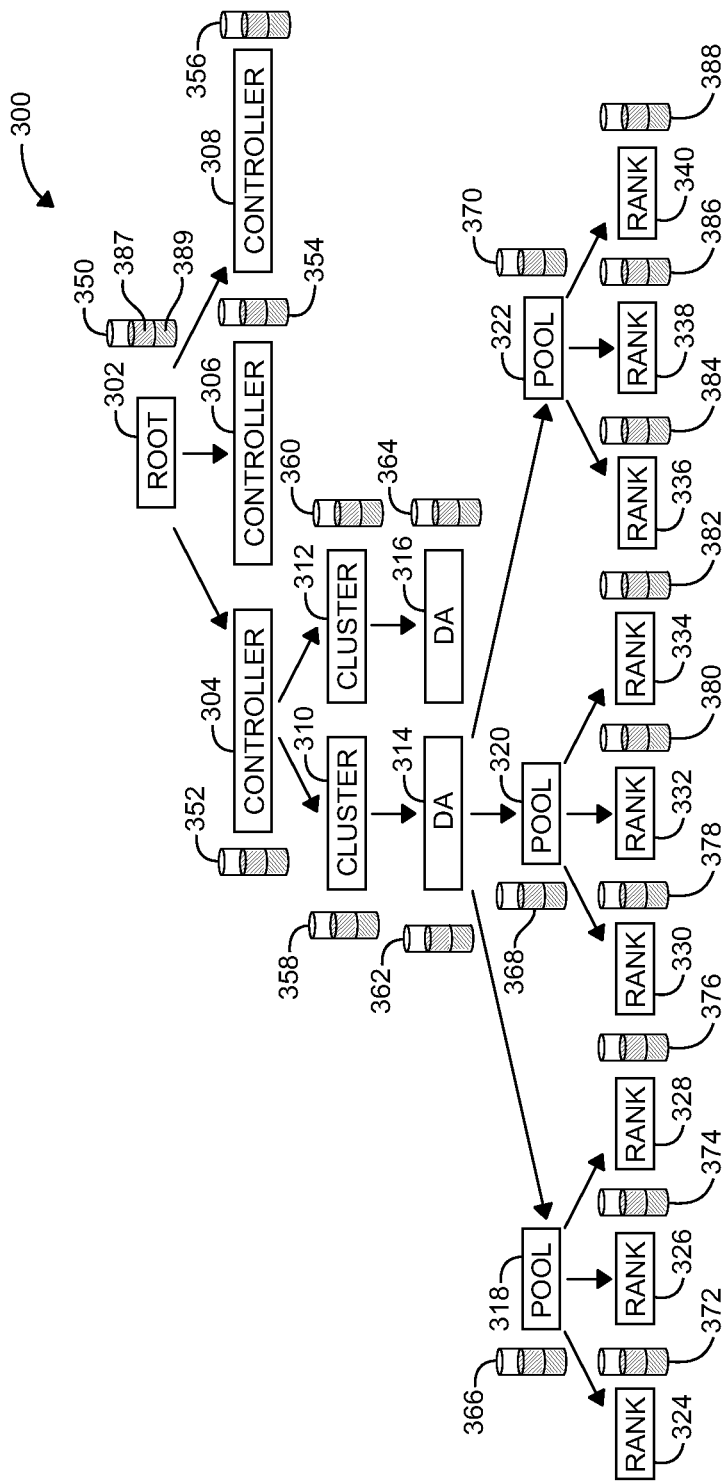
FIG. 3A illustrates a visual representation of the unified resource graph depicted in FIG. 1 which is presentable by a graphical user interface (GUI) to a user.

FIG. 3A illustrates a visual representation 300 of the unified resource graph depicted in FIG. 1 which is presentable by graphical user interface (GUI) 218 to a user with the assistance of GUI module 232 (FIG. 2A). The user may graphically manipulate portions of the visual representation to implement various algorithms as previously described and perform scalable volume provisioning functionality This scalable volume provisioning functionality may include volume allocation functionality as previously described, and bottleneck prevention functionality and what-if analysis functionality as will be further described. Visual representation 300 displays common root node 302, a number of storage controllers 304, 306, and 308 as subtree nodes of the common root node 302, and, in the instant embodiment, a number of additional storage components as subtree nodes of the storage controller 304 (although the skilled artisan will appreciate the additional subtree nodes of controllers 306 and 308 may also be displayed in certain situations). Controller 304 is responsible over clusters 310 and 312, each having a device adapter (DA) 314 and 316. Three pools 318, 320, and 322 are associated with device adapter 314. Ranks 324-340 of storage devices are associated with the three pools 318, 320, and 322 respectively. As is shown, each of the subtree nodes in the visual representation 300 corresponds to logical and/or physical nodes that are internal to each of the storage controllers 304, 306, and 308.

As is further shown, a number of visual representations 350-388 of aggregate summary measures for the common root node 302 and each of the subtree nodes are displayed adjacent to each node. For example, representation 350 is displayed adjacent to root node 302, and representations 352, 354, and 356 are each displayed adjacent to controllers 304, 306, and 308. Visual representations 350-388 may include graphical watermarks, icons, and other visual cues, as one skilled in the art will appreciate. In the depicted embodiment, visual representations 350-388 are graphical icons. A portion 387 of the visual representation 350 is used to designate an amount of the aggregate summary measure that is in use. An additional portion 389 of the visual representation 350 is used to designate an amount of the aggregate summary measure that remains available. As is shown, each of the visual representations 350-388 is adapted with such in-use and available portions. In some embodiments, the portions 387, 389 may be color coded or shaded in a particular manner as to designate them appropriately.

Visual representation 300 of the unified resource graph may be graphically manipulated at will by a user, or may be adapted to be displayed based on a number of factors, such as cursor position and/or screen size. For example, the unified resource graph may implement an automated compression functionality of some nodes (such as subtree nodes below controllers 306 and 308) into higher-level nodes to manage screen space. In another example, a user may manually expand or compress chosen nodes to manage screen space and/or to focus on subtrees of interest. In this way, the universe of storage resources in a particular system is presented to the user in a comprehensive and understandable manner.

Figure 3B:
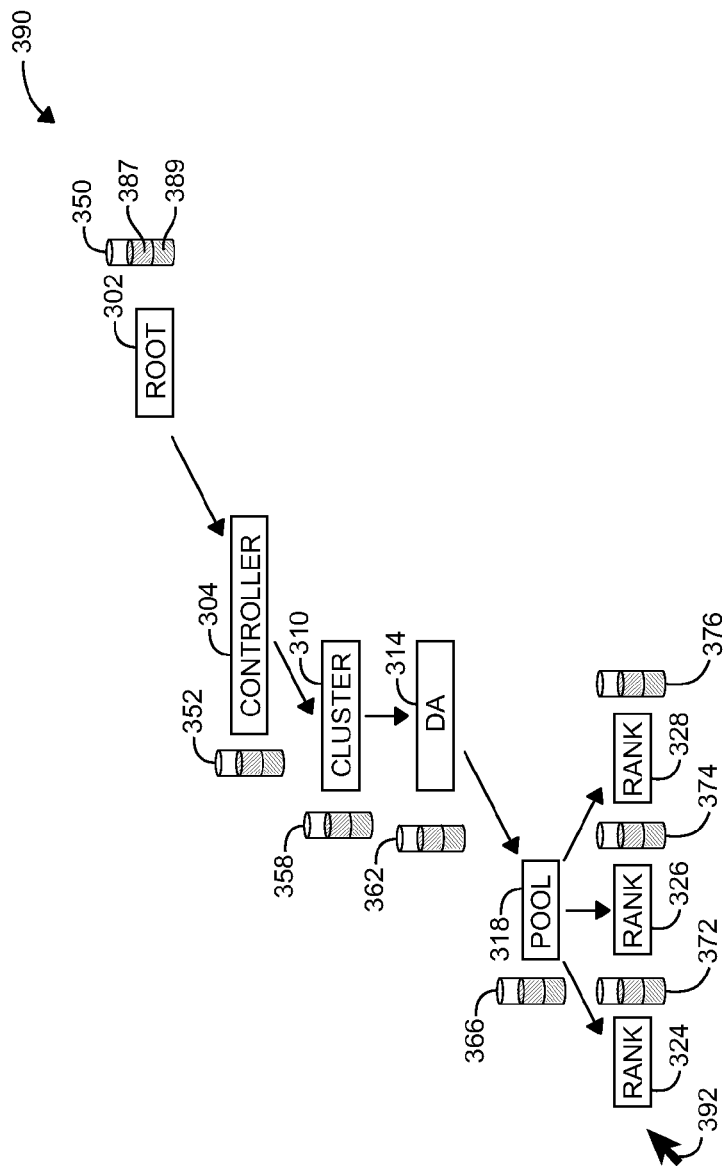
FIG. 3B illustrates dynamic expansion and reduction functionality of the visual representation depicted in FIG. 3 based on a cursor location.

Turning to FIG. 3B, dynamic expansion and reduction functionality of the visual representation 390 is performed based on a cursor 392 location on the display. Such dynamic expansion and reduction functionality may be performed according to the following example. As a first step, the number of nodes that may be displayed on a particular GUI screen is estimated based on a screen and/or window size, and/or based on additional factors. The cursor 392 location may be then determined. The leaf nodes 330-340 (FIG. 3A) furthest from the cursor are then packed into the parent node. This process is then repeated until the number of exposed nodes is less than the number of nodes that may be displayed in a particular setting. The dynamic expansion and reduction functionality may take, as the skilled artisan will appreciate, a variety of factors into account when making a determination as to the appropriate size, information displayed, and number of nodes generated, etc. These factors may include, for example, the number of nodes capable of display as previously mentioned, the position/location of the cursor, the screen and/or window size, one or more scaling factors, and the like.

The illustrated visual representation 390 depicts the result of such dynamic expansion and reduction functionality. Leaf nodes 330-340 have been eliminated from view. In addition to the dynamic expansion and reduction functionality, certain user-selected nodes for compression or expansion may be exempted from the dynamic expansion and reduction functionality. Returning to FIGS. 3A and 3B, cluster 312, device adapter 316, and pools 320 and 322 (shown in FIG. 3A) have all been manually selected as reduction nodes. That is, the user has selected these nodes with the cursor 392 to be reduced or packed into parent nodes. A user may hover the cursor 392 above a particular node. In that case, information (such as a name or number of components within the node) may be displayed. The skilled artisan will appreciate that any number of information about a particular node may be presented to a user.

Exemplary methods 400, 500, 600, and 700 are now presented. As one skilled in the art will appreciate, various steps in these methods may be implemented in differing ways to suit a particular application. In addition, the described methods may be implemented by various means, such as hardware, software, firmware, or a combination thereof operational on or otherwise associated with the storage environment. For example, the method may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Figure 4:
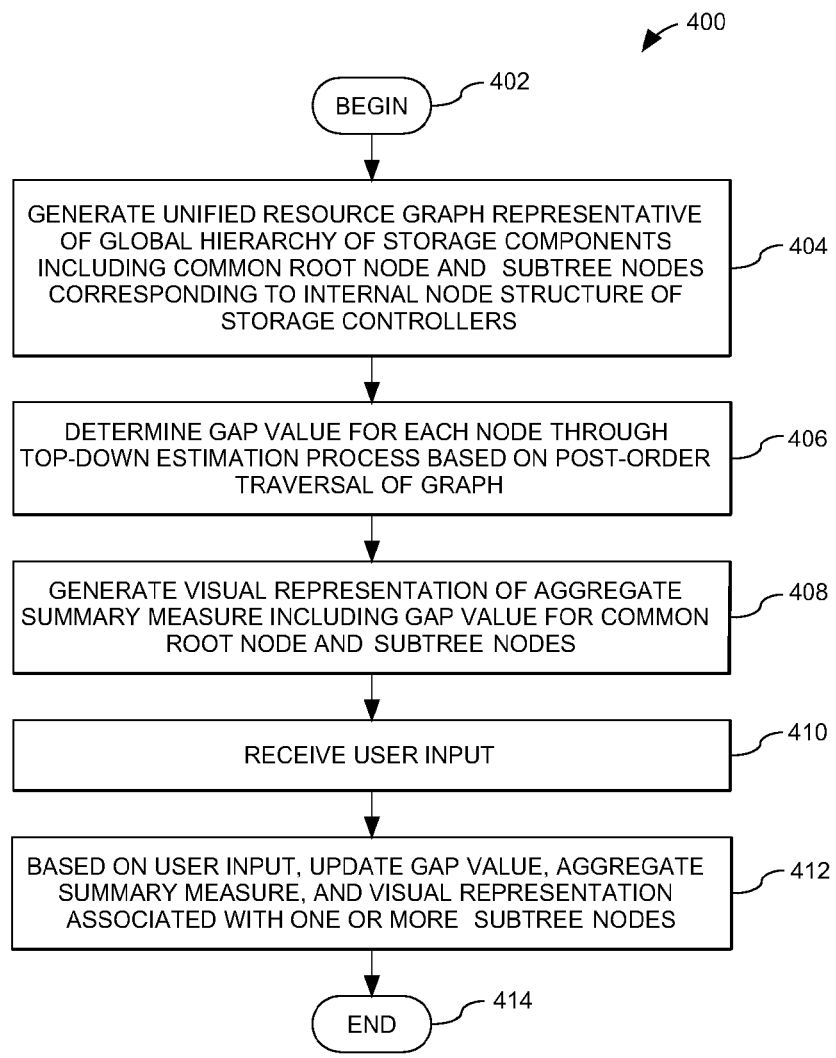
FIG. 4 is a flowchart of exemplary steps for generating the visual representation depicted in FIG. 3A, including an aggregate summary measure.

Turning now to FIG. 4, a flowchart of exemplary steps 400 for generating the visual representation depicted in FIG. 3A, including visual representations of the aggregate summary measures associated with the common node and subtree nodes as previously described. Method 400 begins (step 402) with the generation of a unified resource graph (step 404). The unified resource graph is representative of a global hierarchy of storage components including the common root node and subtree nodes corresponding to internal node structures (logical and/or physical) of the storage controllers.

As a next step, the gap value previously described for each node is determined through a top-down estimation process based on a post-order traversal of the unified resource graph (step 406). A visual representation of the gap value as incorporated into an aggregate summary measure is generated for each of the common root node and subtree nodes (step 408). The unified resource graph and aggregate summary measures for each node are displayed to a user, and some time later, a user input is received (step 410). This user input may, for example, be a manual request to allocate volumes on a particular node in a particular way. In one embodiment, bars and/or measures adjacent to each node lead the user starting from the root and selection of subtree nodes for possible allocation. The user input received may correspond to a particular step in this manual allocation selection process. In other embodiments, the user input may include a request for automated allocation. Once the user input is received, the gap value(s) aggregate summary measure(s), and corresponding visual representation(s) for one or more subtree nodes is updated and displayed, based on the user input (step 412). The method 400 then ends (step 414).

Figure 5:
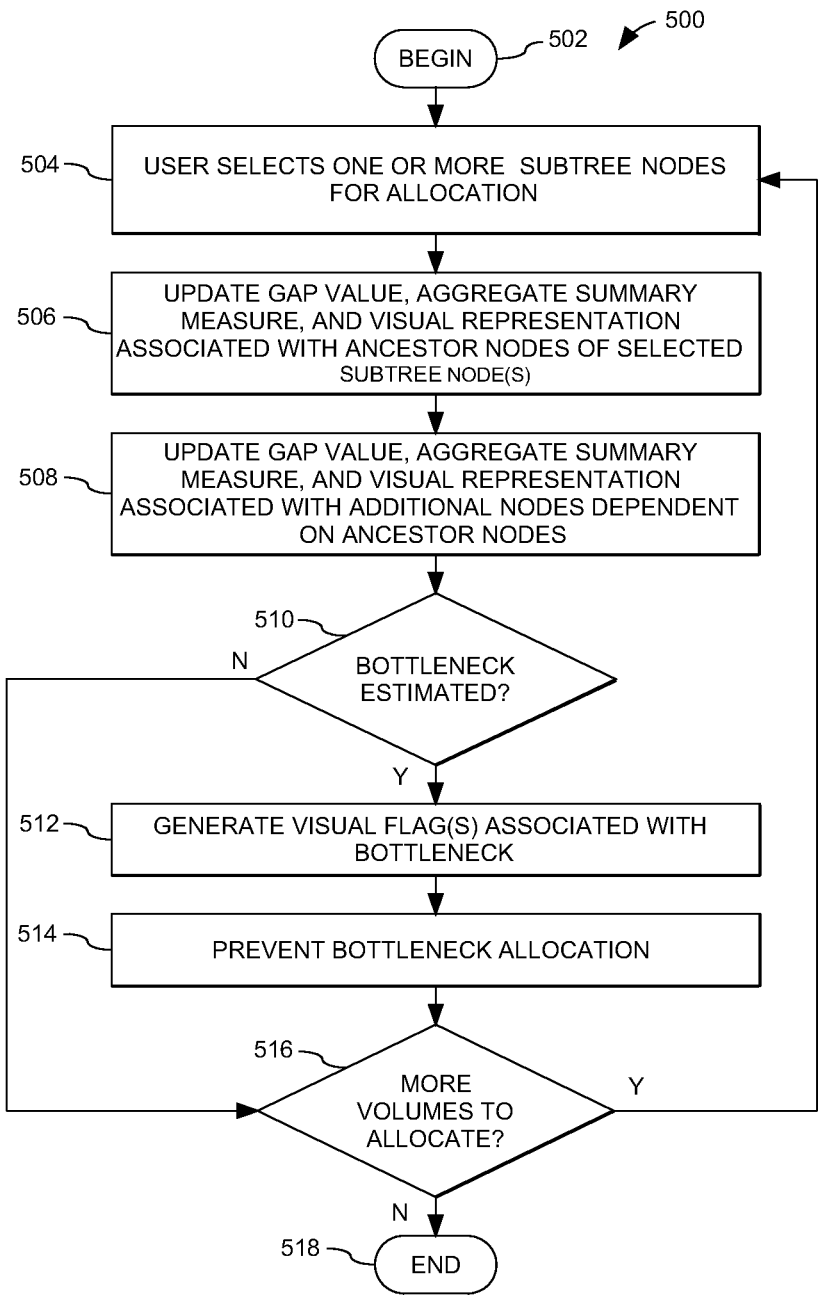
FIG. 5 is a flowchart of exemplary steps for performing a "what if" analysis on the visual representation of the unified resource graph depicted in FIGS. 3A and 3B.

FIG. 5 is a flowchart of exemplary steps for performing a "what if" analysis on the visual representation of the unified resource graph depicted in FIGS. 3A and 3B. The visualization-centric functionality associated with the allocation methodologies formerly presented may include means for performing such what if analyses, so that the user may test particular allocation schemes and visually identify any potential problems associated. Method 500 begins (step 502) with the user selecting one or more subtree nodes for allocation (step 504). As a next step, the gap value, aggregate summary measure, and visual representation associated with ancestor nodes of the selected subtree node(s) is updated and displayed (step 506) according to an allocation algorithm.

As a next step, the gap value, aggregate summary measure, and visual representation associated with additional nodes dependent on the ancestor nodes are updated and displayed (step 508) according to an allocation algorithm. If, as a result of such analysis, a bottleneck is estimated (step 510), such as for example, a parent node's aggregate summary measure lacks sufficient capacity/performance to support an allocation of a child node, then a visual flag associated with the particular bottleneck at issue is generated (step 512). In some cases, the system may prevent a user from completing a particular allocation if a bottleneck will result. In these embodiments, the bottleneck allocation takes effect and the user is visually notified (step 514) in some manner. If additional volumes are to be allocated (step 516), the method 500 continues by returning to step 504. Otherwise, the method 500 ends (step 518).

Figure 6:
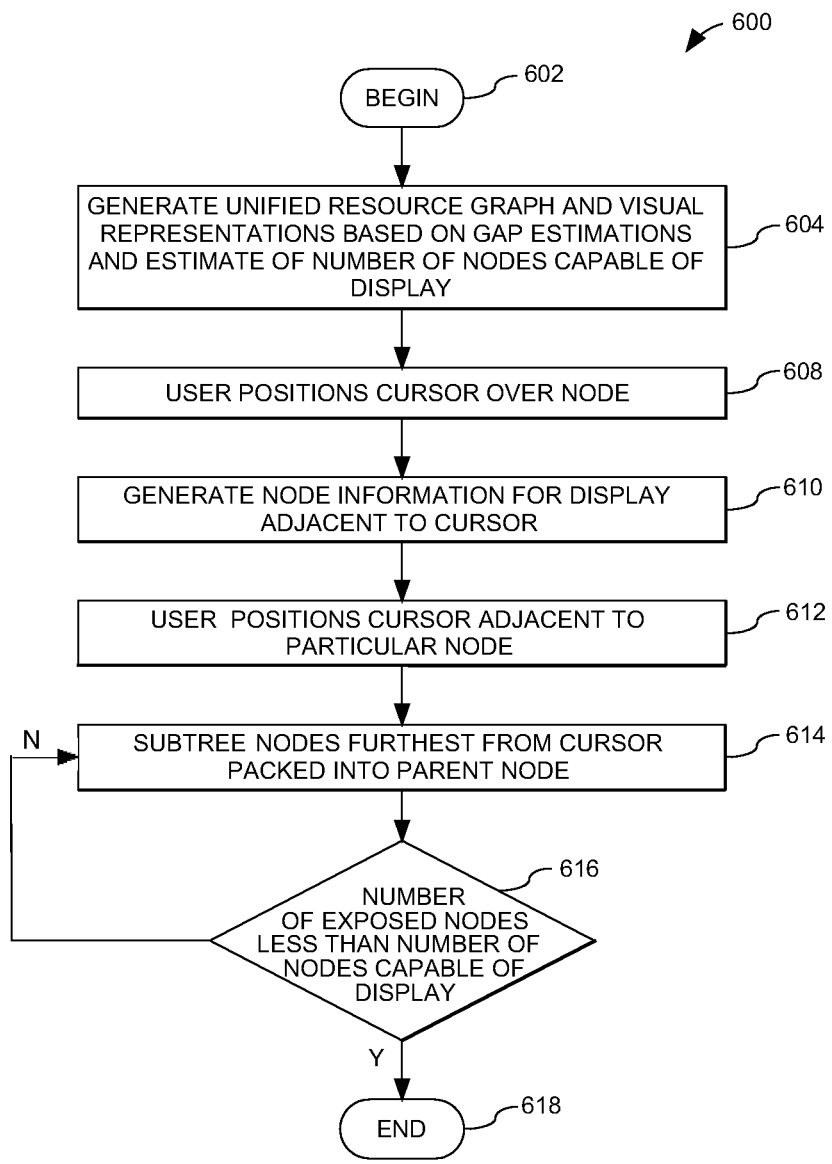
FIG. 6 is a flowchart of exemplary steps for dynamic expansion, reduction and similar display functionality.

FIG. 6 is a flowchart of exemplary steps for dynamic expansion, reduction and similar display functionality as previously described. Method 600 begins (step 602) with the generation of the unified resource graph based on an estimate of the number of nodes capable of display on a particular GUI screen (step 604). As a result of the user positioning the cursor over a particular node (step 608), node information as previously described is presented adjacent to the cursor (step 610). Later, as a result of the user positioning the cursor adjacent to a particular node (step 612), the subtree nodes furthest from the cursor are packed into their respective parent nodes (step 614). If the number of exposed nodes is not less than the number of nodes capable of display (step 616), then step 614 is repeated until this is the case. The method 600 then ends (step 618).

Figure 7:
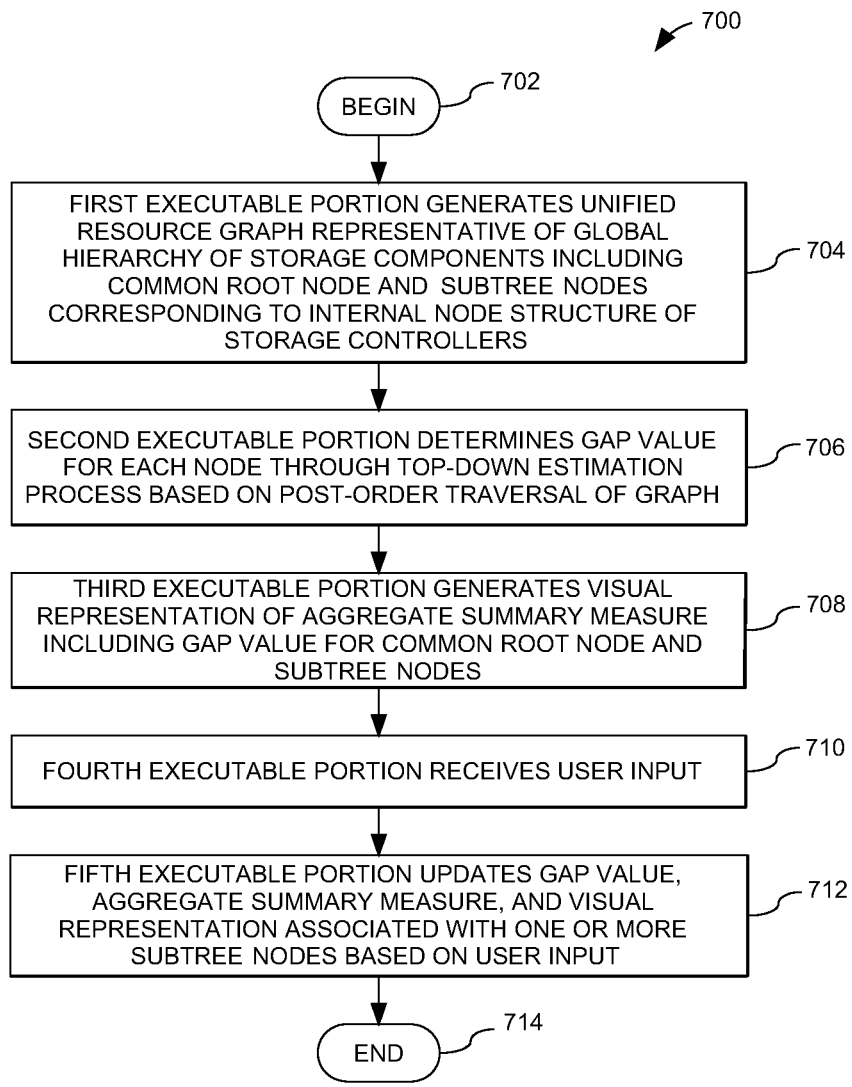
FIG. 7 is a flow chart of exemplary steps for generating the visual representation depicted in FIG. 3A as implemented by a computer program product.

FIG. 7 is a flowchart of exemplary steps for generation/display of the unified resource graph described previously in FIG. 4, but as implemented by a computer program product having computer-readable code portions. Method 700 begins (step 702) with the generation of the unified resource graph as described previously by a first executable portion (step 704). A second executable portion determines the gap value, again as previously described (step 706). A third executable portion generates the visual representations of the aggregate summary measures (step 708). A fourth executable portion receives a user input (step 710). Finally, a fifth executable portion updates the gap value, the aggregate summary measure, and the visual representation as based on the user input (step 712). The method 700 then ends (step 714).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A method for visualization-centric performance-based volume allocation in a data storage system using a processor in communication with a memory device, comprising:

generating, on a display, a unified resource graph representative of a global hierarchy of storage components, including each of a plurality of storage controllers, in the data storage system;

wherein the unified resource graph includes a common root node and a plurality of subtree nodes corresponding to each of a plurality of nodes internal to the plurality of storage controllers, the common root node and the plurality of subtree nodes ordered in a top-down orientation;

wherein generating the unified resource graph includes generating a visual representation of an aggregate summary measure for the common root node and each of the plurality of subtree nodes; the aggregate summary measure including an indication of an amount of a resource in use and an amount of the resource that remains available;

generating as estimate of a maximum permissible size of a new workload based on a current performance utilization of a node and a nominal cost at the node, the nominal cost representing a percentage of performance utilization incurred upon allocating a unit of the new workload on the node; and performing scalable volume provisioning of an existing or new workload amount by graphical manipulation of at least one of the storage components represented by the unified resource graph based on an input, said graphical manipulation comprising:

dynamically expanding and reducing a number of displayed subtree nodes in the unified resource graph based on one of an estimated screen size and an estimated window size of the display, and if reducing the number of displayed subtree nodes:
determining a position of a cursor on the display, and
collapsing a subtree node furthest from the position of the cursor into the common root node.

2. The method of claim 1, wherein performing scalable volume provisioning includes performing at least one of allocating at least one volume in the data storage system, preventing a bottleneck impeding data flow between the storage components.

3. The method of claim 1, wherein graphical manipulation of at least one of the storage components represented by the unified resource graph includes graphical manipulation of at least one of the at least one volume, a rank, a pool, a device adapter, a cluster processor complex, a host adapter, and one of the plurality of storage controllers.

4. The method of claim 3, further including displaying node information associated with the at least one of the at least one volume, the rank, the pool, the device adapter, the cluster processor complex, the host adapter, and the one of the plurality of storage controllers.

5. The method of claim 1, further including, based on the input, dynamically updating the aggregate summary measure and the visual representation thereby.

6. The method of claim 1, wherein generating a visual representation includes generating an icon for display adjacent to each of the common root node and the plurality of subtree nodes.

7. The method of claim 1, further including performing at least one of:

performing at least one of expanding and compressing at least a portion of the common root node and the plurality of subtree nodes based on the input, and performing at least one of dynamically expanding and compressing at least a portion of the common root node and the plurality of subtree nodes based on one of a number of the plurality of subtree nodes depicted on a display, a scaling factor, and a cursor position determination.

8. A system for visualization-centric performance-based volume allocation in a data storage system, comprising:

a memory storing a graphical user interface (GUI) module operational in the data storage system, wherein the GUI module is adapted for:

generating a unified resource graph representative of a global hierarchy of storage components, including each of a plurality of storage controllers, in the data storage system, wherein the unified resource graph includes a common root node and a plurality of subtree nodes corresponding to each of a plurality of nodes internal to the plurality of storage controllers, the common root node and the plurality of subtree nodes ordered in a top-down orientation, and generating a visual representation of an aggregate summary measure for the common root node and each of the plurality of subtree nodes, the aggregate summary measure including an indication of an amount of a resource in use and an amount of the resource that remains available, generating an estimate of a maximum permissible size of a new workload based on a current performance utilization of a node and a nominal cost at the node, the nominal cost representing a percentage of performance utilization incurred upon allocating a unit of the new workload on the node and performing scalable volume provisioning of an existing or new workload amount by graphical manipulation of at least one of the storage components represented by the unified resource graph based on an input, said graphical manipulation comprising:

dynamically expanding and reducing a number of displayed subtree nodes in the unified resource graph based on one of an estimated screen size and an estimated window size of the display, and if reducing the number of displayed subtree nodes:
determining a position of a cursor on the display, and
collapsing a subtree node furthest from the position of the cursor into the common root node.

9. The system of claim 8, wherein the GUI module is further adapted for performing at least one of allocating at least one volume in the data storage system, preventing a bottleneck impeding data flow between the storage components, and performing a what-if analysis.

10. The system of claim 8, wherein the GUI module is further adapted for graphical manipulation of at least one of the at least one volume, a rank, a pool, a device adapter, a cluster processor complex, a host adapter, and one of the plurality of storage controllers.

11. The system of claim 10, wherein the GUI module is further adapted for displaying node information associated with the at least one of the at least one volume, the rank, the pool, the device adapter, the cluster processor complex, the host adapter, and the one of the plurality of storage controllers.

12. The system of claim 8, wherein the GUI module is further adapted for, pursuant to the input, dynamically updating the aggregate summary measure and the visual representation thereby.

13. The system of claim 8, wherein the GUI module is further adapted for, pursuant to generating a visual representation, generating an icon for display adjacent to each of the common root node and the plurality of subtree nodes.

14. The system of claim 13, wherein the icon includes a first portion representative of a portion of the aggregate summary measure in use, and a second portion representative of a portion of the aggregate summary measure still available.

15. The system of claim 8, wherein the GUI module is further adapted for:

performing at least one of expanding and compressing at least a portion of the common root node and the plurality of subtree nodes based on the input, and performing at least one of dynamically expanding and compressing at least a portion of the common root node and the plurality of subtree nodes based on one of a number of the plurality of subtree nodes depicted on a display, a scaling factor, and a cursor position determination.

16. A computer program product for visualization-centric performance-based volume allocation in a data storage system using a processor in communication with a memory device, the computer program product comprising a hardware computer-readable storage medium having computer-readable program code portions stored therein, the computer-readable program code portions comprising:
   a first executable portion for generating a unified resource graph representative of a global hierarchy of storage components, including each of a plurality of storage controllers, in the data storage system, wherein the unified resource graph includes a common root node and a plurality of subtree nodes corresponding to each of a plurality of nodes internal to the plurality of storage controllers, the common root node and the plurality of subtree nodes ordered in a top-down orientation;
   a second executable portion for generating a visual representation of an aggregate summary measure for the common root node and each of the plurality of subtree nodes; the aggregate summary measure including an indication of an amount of a resource in use and an amount of the resource that remains available;
   a third executable portion for generating an estimate of a maximum permissible size of a new workload based in a current performance utilization of a node and a nominal cost at the node, the nominal cost representing a percentage of performance utilization incurred upon allocating a unit of the new workload in the node; and
   a fourth executable portion for performing scalable volume provisioning of an existing or new workload amount by graphical manipulation of at least one of the storage components represented by the unified resource graph based on an input, said graphical manipulation comprising:
      dynamically expanding and reducing a number of displayed subtree nodes in the unified resource graph based on one of an estimated screen size and an estimated window size of the display, and
      if reducing the number of displayed subtree nodes:
         determining a position of a cursor on the display, and
         collapsing a subtree node furthest from the position of the cursor into the common root node.

17. The computer program product of claim 16, wherein the fourth executable portion for performing scalable volume provisioning includes performing at least one of allocating at least one volume in the data storage system, preventing a bottleneck impeding data flow between the storage components, and performing a what-if analysis.

18. The computer program product of claim 16, further including a fifth executable portion for displaying node information associated with the at least one of the at least one volume, the rank, the pool, the device adapter, the cluster processor complex, the host adapter, and the one of the plurality of storage controllers.

19. The computer program product of claim 16, further including a fifth executable portion for, based on the input, dynamically updating the aggregate summary measure and the visual representation thereby.

20. The computer program product of claim 17, further including a fifth executable portion for performing at least one of dynamically expanding and compressing at least a portion of the common root node and the plurality of subtree nodes based on one of a number of the plurality of subtree nodes depicted on a display, a scaling factor, and a cursor position determination.

* * * * *